Figure 1:
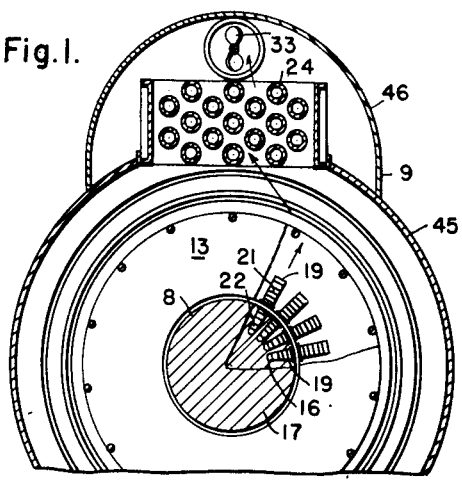

Dec. 22, 1953  R. A. BAUDRY  2,663,807
SEPARATELY MOUNTED FAN-MEANS FOR GENERATOR-VENTILATION
Filed Oct. 10, 1951  2 Sheets-Sheet 1

WITNESSES:

INVENTOR
René A. Baudry.
BY
ATTORNEY

Dec. 22, 1953  R. A. BAUDRY  2,663,807
SEPARATELY MOUNTED FAN-MEANS FOR GENERATOR-VENTILATION
Filed Oct. 10, 1951  2 Sheets-Sheet 2

WITNESSES:
E. A. McCloskey
Rw. L. Groome

INVENTOR
René A. Baudry.
BY O. B. Buchanan
ATTORNEY

Patented Dec. 22, 1953

2,663,807

UNITED STATES PATENT OFFICE 2,663,807

SEPARATELY MOUNTED FAN MEANS FOR GENERATOR VENTILATION

René A. Baudry, Pittsburgh, Pa., assignor to Westinghouse Electric Corporation, East Pittsburgh, Pa., a corporation of Pennsylvania Application October 10, 1951, Serial No. 250,643

5 Claims. (Cl. 310—53)

My invention relates to motor-driven fans, for the cooling of hydrogen-cooled generators.

Heretofore, hydrogen-cooled generators have commonly been provided with shaft-mounted fans for maintaining the necessary hydrogen-circulation. Before the advent of hydrogen-cooling, some air-cooled machines used external or motor-driven fans, not mounted on the shaft of the cooled machine. When hydrogen-cooling is used, however, it is necessary to provide a compact construction, in which provision is made to withstand the pressure of the hydrogen, in case the hydrogen is maintained at a pressure which is materially higher than the atmospheric pressure; and even if low hydrogen-pressures are used, such as the heretofore-standard half-pound gauge-pressure, the enclosing casing had to be made strong enough to be resistant to possible explosion-pressures. In any event, previously known externally driven or motor-driven fans, such as have been used in air-cooled turbine-generators or other dynamo-electric machines, have involved arrangements which are too bulky and complicated to use in the restricted space which is available in hydrogen-cooled machines as heretofore constructed.

On the other hand, modern hydrogen-cooled machines are beginning to require greater fan-pressures than has heretofore been used in such machines. Sometimes, the desired fan-pressures have exceeded pressure-heads which are obtainable with fans which are directly mounted on the rotor-shaft of the machine, or which would necessitate the use of longer shaft-ends to accommodate multi-stage fans which would increase the length of the shaft between the two bearings in which the rotor member is supported, thus increasing the danger of rotor-whipping, or even mechanical failure of the machine.

It is an object of my present invention to provide a cooling-system or arrangement, and a fan-location and arrangement, whereby motor-driven fans can be the most economically provided, in a hydrogen-cooled machine, without too greatly increasing the necessary size of the housing.

Heretofore, the most successful, and hence the usual, arrangement of hydrogen-cooled machines has involved a recirculation-arrangement in which the hydrogen flows in opposite circumferential directions through two circumferentially spaced, axially extending coolers which are provided between the outer periphery of the stator-core and the housing, the hydrogen then flowing axially to the opposite ends of the space between the coolers; and thence being returned to the intake-sides of two shaft-mounted fans at the respective ends of the rotor, in a manner similar to the showings in the Savage Patent 2,078,164, April 20, 1937, the Sterrett Patent 2,504,899, April 18, 1950, and my copending application Serial No. 109,999, filed August 12, 1949 and its substitute-application Serial No. 248,853, filed September 28, 1951. It has also been known to provide a recirculation-arrangement in which the hydrogen flows radially outwardly (not circumferentially) through the central portion of a single axially disposed cooler, the hydrogen then passing axially, between the cooler and the housing, so as to flow to the opposite ends of the machine, where the hydrogen passes radially inwardly across the end-zone portion of the cooler, and thence to the intake-sides of the two shaft-mounted fans, as shown in my Patent 2,427,702, granted September 23, 1947.

In accordance with my present invention, I slightly enlarge either the circumferential space between the two coolers of the circumferential-flow type of machine, or the radial space between the single cooler and the housing, in the radial-flow type of machine; and I use motor-driven fans which are disposed in the aforesaid enlarged space. Here, there is plenty of axial length or room to build these fans, with as many stages, or as great an axial fan-length, as may be desired, so as to create any desired fan-pressures for maintaining the hydrogen-circulation. These motor-driven fans may be used either with or without the conventional shaft-mounted fans, the simpler construction being to omit the shaft-mounted fans altogether, thus avoiding the necessity for the fan-baffles or shrouds in the respective end-zones of the machine, and also reducing the shaft-length.

Figure 2:
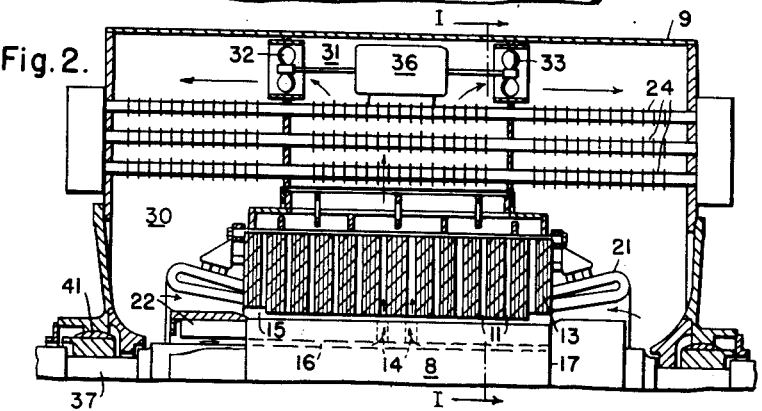
Figure 3:
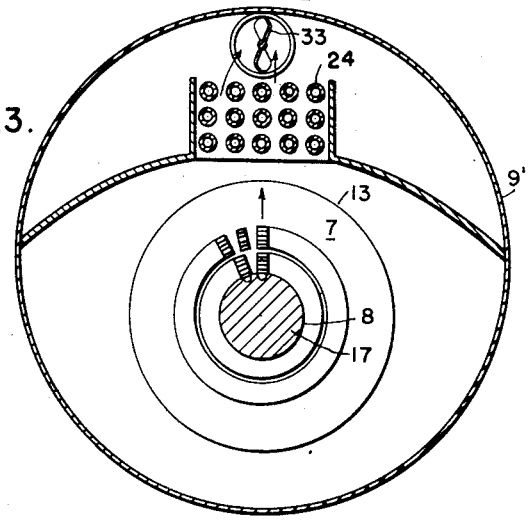
Figure 4:
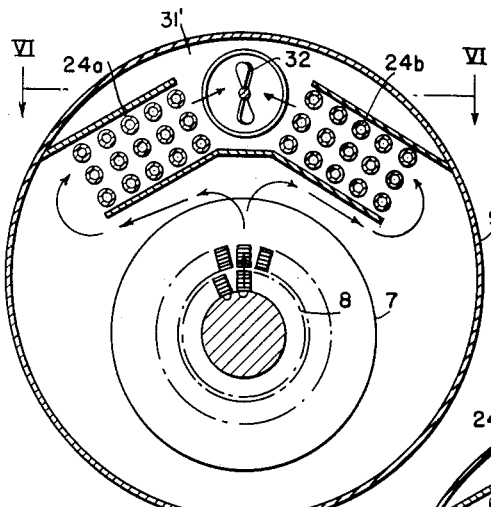
Figure 5:
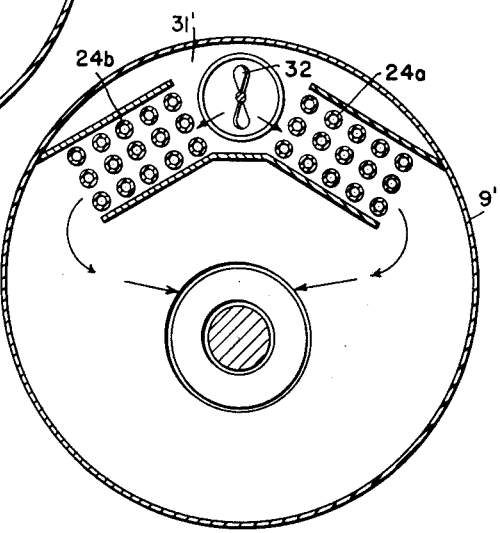
Figure 6:
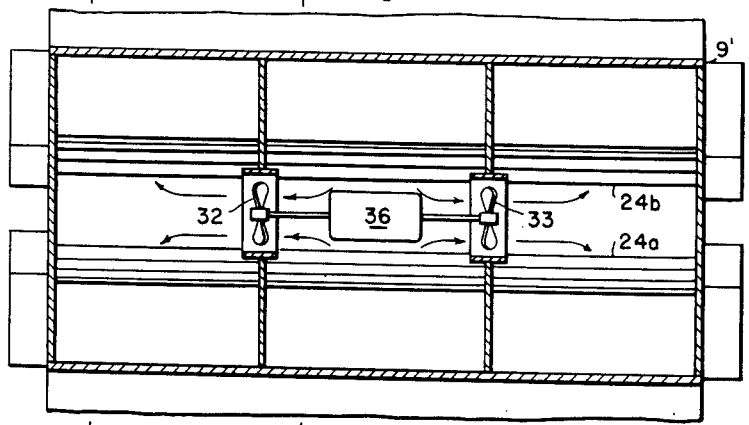

With the foregoing and other objects in view, my invention consists in the combinations, structures, parts, and methods of design and use, hereinafter described and claimed, and illustrated in the accompanying drawing, wherein Figure 1 is a transverse sectional view of a radial-flow turbine-generator embodying my invention, the section-plane being indicated at I—I in Fig. 2, Fig. 2 is a vertical longitudinal sectional view of the machine which is shown in either Fig. 1 or Fig. 3, Fig. 3 is a view similar to Fig. 1, showing an alternative form of construction of a similar type of machine, Fig. 4 is a transverse sectional view of a circumferential-flow turbine-generator embodying my invention, the section-plane being indicated at IV—IV in Fig. 6, Fig. 5 is a transverse sectional view of the machine shown in Figs. 4 and 5, the section-plane being indicated at V—V in Fig. 6, and Fig. 6 is a fragmentary plan view of the machine shown in Fig. 4, with the housing removed, approximately as would be seen from the section-plane VI—VI in Fig. 4.

The dynamo-electric machine which is chosen for illustration in Figs. 1 and 2 is a two-pole 60-cycle polyphase turbine generator, having a stator member 7 and a rotor member 8. A gas-filled housing 9 encloses the entire machine, the gas filling being preferably hydrogen, and preferably at a gauge-pressure higher than 15 pounds per square inch, although my invention is not limited to this detail.

Both the stator member 7 and the rotor member 8 have cooling-passageways therein, including one or more radial passageways. In the case of the stator, the radial passageways are illustrated in the form of ventilating spaces 11 between bunches of laminations of the cylindrical stator core 13. In the case of the rotor, the radial passageways include a plurality of radial holes 14, which extend from the air gap 15 down into communication with a plurality of axially extending ducts 16 in the cylindrical rotor core 17.

Both the stator and rotor cores have winding-receiving slots 19, for receiving, respectively, a polyphase armature or stator winding 21 of relatively high voltage, and a field or rotor winding 22 of relatively low voltage. My present invention is applicable to a design in which the stator and rotor windings, or either one of them, may be of a standard construction in which the winding-heat passes through the major winding-insulation into the stator or rotor core, as the case may be, and the heat is then extracted from the core; or either one or both of the windings may be of an inner-cooled variety, in which cooling-ducts are provided alongside of the winding-conductors, in good thermal relation thereto, and inside of the major-insulation sheathing which acts as a slot-liner, so that the heat is withdrawn directly from the conductor, without having to pass through the major insulation and into the core, as described in my Patent 2,221,567, granted November 12, 1940, and in my above mentioned application Serial No. 109,999.

Hydrogen-cooled machines require a heat-exchanging means, for cooling the recirculated hydrogen. In the illustrated embodiment of my invention as shown in Figs. 1 and 2, this cooling-means is shown as an axially extending cooler 24 which is disposed between the housing 9 and the stator core 13, in radially spaced relation to each.

In hydrogen-cooled machines, it is also necessary to provide a recirculation-means, including whatever baffles are necessary for causing the hydrogen to flow through the cooling-passageways of the stator and rotor, and through the cooler 24. In the illustrated embodiment of my present invention as shown in Figs. 1 and 2, this recirculation-path, as shown by the arrows, causes the hydrogen to flow radially through the radial passageways 14 and 11 of the rotor and stator members, and radially through the central portion of the cooler 24. The recirculation-controlling baffles, as shown by the gas-flow arrows, also cause the hydrogen to flow radially in the opposite direction through the end portions of the cooler 24 and in the end-zone spaces 30 of the machine, very much after the manner which is broadly described and claimed in my Patent 2,427,702.

My present invention, in the form shown in Figs. 1 and 2, is characterized by having a specially located fan-means, disposed in the radial space 31 between the cooler 24 and the housing 9, for maintaining or augmenting the hydrogen-circulation. In this space 31 between the cooler and the housing, I show two axially spaced fans 32 and 33, for causing axial gas-movements in opposite directions between the central radial gas-movement and the respective end-zone gas-movements. These fans 32 and 33 are driven by any suitable motive-means such as an electric motor 36 or other drive-means, as distinguished from a shaft-mounted fan which is mounted on the rotor-shaft 37 of the main machine or turbine-generator.

In the space 31 where I have located my two fans 32 and 33, it is easy to find, or to provide, room in which the fans, and their driving-means, if desired, can be mounted. There is sufficient axial room here to permit the use of multi-stage axial-impeller fans, or other fan-constructions having a considerable axial length, which is in contrast to the axial spaces which are available, at the respective shaft-ends 37 of the rotor 8 of the main machine. I am thus enabled to provide any desired recirculation-velocity of the hydrogen, or other cooling gas, without increasing the overall axial length of the machine, from one bearing 41 to the other bearing.

It will be understood that my cooler-adjacent fans 32 and 33 of Figs. 1 and 2 may be either the sole recirculation-maintaining means, or may augment shaft-mounted fans. I have omitted the shaft-mounted fans, in my preferred forms of embodiment of my invention, as illustrated, so that I can reduce the overall axial length of the machine by the amount which would otherwise be required to provide the shaft-mounted fans. The baffling means or end-zone fan-shrouding is also simplified, by omitting the usual shaft-mounted fans.

My invention, in the radial-flow form of embodiment as just described, may use any housing-arrangement which is compact, and which provides the necessary radial spaces for the cooler or coolers 24 outside of the stator core 13, and for the fans 32 and 33 outside of each cooler, and inside of the housing 9. It is desirable also that the housing-arrangement should be compact, and mechanically strong enough to resist the required pressures. I have shown two such housing-arrangements in Figs. 1 and 3, respectively. In Fig. 1, I have shown a housing-arrangement which is similar to that which is described and claimed in my Patent 2,427,702, wherein the housing 9 comprises an essentially cylindrical main portion 45, having an axially extending bulge-portion 46 for receiving the cooling-means 24 and the fan-means 32 and 33. In Fig. 3, I have shown a construction in which the housing 9' is essentially cylindrical, and is eccentric with respect to the stator-core 13, whereby to provide a radial space to receive the cooling-means 24 and the fan-means 32 and 33.

In Figs. 4, 5, and 6, I have shown my invention embodied in a centrifugal-flow type of machine, in which two circumferentially spaced, axially extending coolers 24a and 24b are disposed between the eccentric housing 9' and the stator-core 13, so as to provide a circumferential space or spacing 31', in which the two fans 32 and 33 are disposed, together with their motor 36. The baffling arrangement, as indicated by the arrows in Fig. 4, is such as to cause the gas to flow radially outwardly through the rotor and stator members 8 and 7, and then to flow in opposite circumferential directions through the central portions of the two coolers 24a and 24b, respectively, so that the gas enters into the circumferential space 31' between the coolers. The baffling arrangement is such that the two fans 32 and 33 cause the gas to flow axially in opposite directions, in the aforesaid space 31', toward the respective ends of the machine. The baffling arrangement, as shown by the arrows in Figs. 5 and 6, is such that the gas then flows circumferentially back again, in the opposite directions, through the end portions of the respective coolers 24a and 24b, and thence into the end-zone spaces of the machine, where the recirculation starts all over again, through the rotor and stator members 8 and 7.

While I have illustrated my invention in only three exemplary forms of embodiment, I wish it to be understood that my invention is not limited to the illustrated details in every respect; and I desire that the appended claims shall be accorded the broadest construction consistent with their language.

I claim as my invention:

1. A dynamo-electric machine having stator and rotor members, both having cylindrical cores, both cores having axially extending slots and having windings carried by said slots, both said stator member and said rotor member having cooling-passageways therein, the cooling-passageways of both the stator member and the rotor member including one or more radial passageways, the cooling-passageways of at least said rotor member including axially extending ducts in communication with the radial passageways of that member, a gas-filled housing enclosing the entire machine, axially extending cooling-means disposed between said housing and the stator core, and recirculation-means including baffles for causing the gas to pass radially through the radial passageways of the stator and rotor members and through the central portion of the cooling-means, said baffles also causing the gas to flow in the opposite direction through the end portions of the cooling-means and thence into the end-zone spaces of the machine, said recirculation-means being characterized by including two axially spaced fan-means, disposed adjacent to said cooling-means, for causing axial gas-movements in opposite directions between said central gas-movement and the respective end-zone gas-movements, and motive-means for driving said two fan-means.

2. A dynamo-electric machine having stator and rotor members, both having cylindrical cores, both cores having axially extending slots and having windings carried by said slots, both said stator member and said rotor member having cooling-passageways therein, the cooling-passageways of both the stator member and the rotor member including one or more radial passageways, the cooling-passageways of at least said rotor member including axially extending ducts in communication with the radial passageways of that member, a gas-filled housing enclosing the entire machine, an axially extending cooling-means disposed between said housing and the stator core in radially spaced relation to each, and recirculation-means including baffles for causing the gas to pass radially through the radial passageways of the stator and rotor members and radially through the central portion of the cooling-means, said baffles also causing the gas to flow radially in the opposite direction through the end portions of the cooling-means and in the end-zone spaces of the machine, said recirculation-means being characterized by including two axially spaced fan-means, disposed in the radial space between said cooling-means and said housing, for causing axial gas-movements in opposite directions between said central radial gas-movement and the respective end-zone gas-movements, and motive-means for driving said two fan-means.

3. The invention as defined in claim 2, characterized by said housing comprising an essentially cylindrical main portion having an axially extending bulge for receiving said cooling-means and said fan-means.

4. The invention as defined in claim 2, characterized by said housing being essentially cylindrical and being eccentric with respect to the stator-core, whereby to provide a radial space to receive said cooling-means and said fan-means.

5. A dynamo-electric machine having stator and rotor members, both having cylindrical cores, both cores having axially extending slots and having windings carried by said slots, both said stator member and said rotor member having cooling-passageways therein, the cooling-passageways of both the stator member and the rotor member including one or more radial passageways, the cooling-passageways of at least said rotor member including axially extending ducts in communication with the radial passageways of that member, a gas-filled housing enclosing the entire machine, at least one pair of circumferentially spaced, axially extending coolers disposed between said housing and the stator core, and recirculation-means including baffles for causing the gas to pass radially through the radial passageways of the stator and rotor members and in opposite circumferential directions through the central portions of the two coolers, into the circumferential space between said coolers, said baffles also causing the gas to flow circumferentially in the opposite directions through the end portions of the respective coolers, and thence into the end-zone spaces of the machine, said recirculation-means being characterized by including two axially spaced fan-means, disposed in the circumferential space between the two coolers, for causing axial gas-movements in opposite directions between said central gas-movement and the respective end-zone gas-movements, and motive means for driving said two fan-means.

RENÉ A. BAUDRY.

References Cited in the file of this patent

UNITED STATES PATENTS

| Number | Name | Date |
| --- | --- | --- |
| 2,451,219 | Holmgren | Oct. 12, 1948 |

FOREIGN PATENTS

| Number | Country | Date |
| --- | --- | --- |
| 595,219 | Great Britain | Nov. 28, 1947 |
| 520,312 | Germany | Mar. 30, 1931 |
| 717,071 | Germany | Feb. 5, 1942 |